United States Patent [19]
Lovrenich

[11] 3,732,443
[45] May 8, 1973

[54] ON-OFF DETECTION DEVICE

[75] Inventor: Rodger T. Lovrenich, Temperance, Mich.

[73] Assignee: Renko Associates, Grosse Pointe, Mich.

[22] Filed: May 12, 1971

[21] Appl. No.: 142,596

[52] U.S. Cl. ............ 307/308, 367/272, 331/65, 331/138, 340/285
[51] Int. Cl. ............ H03k 17/00
[58] Field of Search ............ 328/208; 331/110, 331/138, 65; 323/75 H, 75 M, 75 N; 307/308

[56] References Cited

UNITED STATES PATENTS

| | | | |
|---|---|---|---|
| 3,568,044 | 3/1971 | Elazar | 323/75 N |
| 3,411,005 | 11/1968 | Taylor | 323/75 H |
| 3,315,142 | 4/1967 | Weiss | 331/110 X |
| 3,157,841 | 11/1964 | Gilbert | 323/75 N X |
| 3,432,774 | 3/1969 | Fick | 331/110 X |
| 3,414,834 | 12/1968 | Stubbs | 323/75 N UX |

OTHER PUBLICATIONS

A Note on Alternating Current Bridge Measurements on Iron-Cored Coils by Greig et al. Journal of Scientific Instruments 2/49, pgs. 268 & 269

Precision OSC based on an Operational Amp by Brach, Electronic Engineering 11/66 pgs. 724 & 725.

*Primary Examiner*—Herman Karl Saalbach
*Assistant Examiner*—B. P. Davis
*Attorney*—Earl F. Kotts

[57] ABSTRACT

The invention relates to an on - off detecting device embodying a Wheatstone Bridge, wherein one leg of the bridge accommodates a resistance effect element which changes resistance value upon sensing a phenomenon, the change of resistance driving a differential input, high gain, common mode rejection amplifier into oscillation through positive feedback, and shutting off the amplifier through negative feedback.

10 Claims, 7 Drawing Figures

PATENTED MAY 8 1973 3,732,443
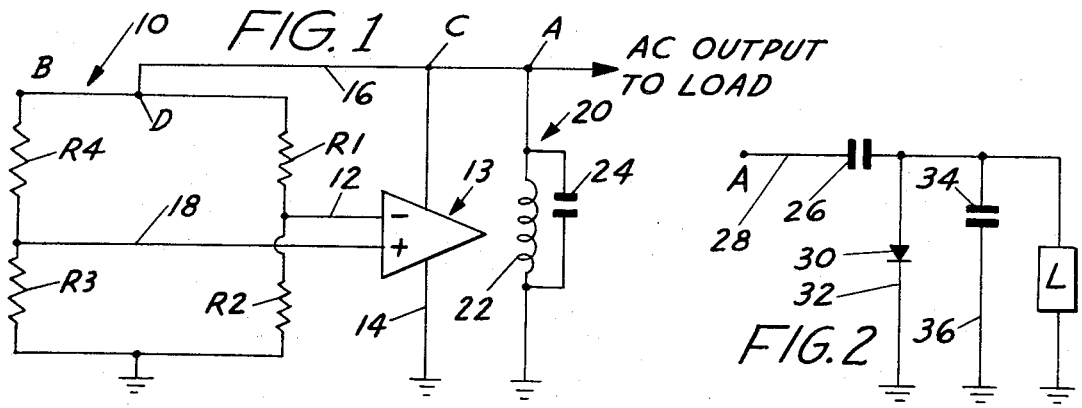
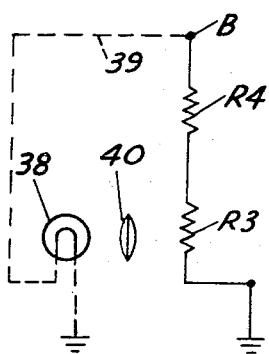
FIG.3
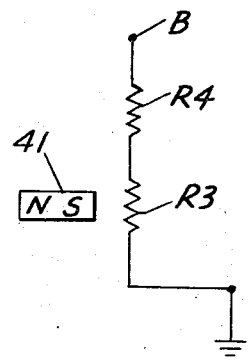
FIG.4
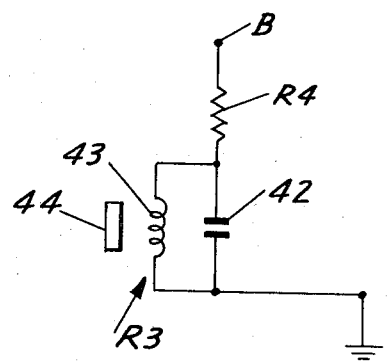
FIG.5
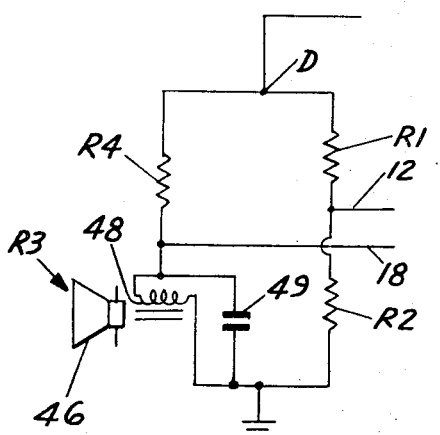
FIG.6
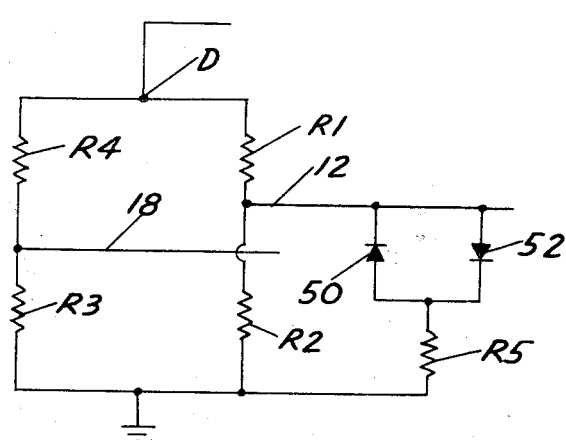
FIG.7
INVENTOR.
RODGER T. LOVRENICH

ON-OFF DETECTION DEVICE

BACKGROUND OF THE INVENTION

There has been a need in the field of detection devices for an inexpensive, highly effective, fast response device which can detect changes in various phenomena.

Previous inexpensive devices have lacked dependability and sufficiently rapid response.

Electronic attempts have resulted in complex, relatively expensive devices which require circuit balancing components, bias elements, etc. Each phenomenon to be detected has resulted in a different type of circuit and a different principle of detection.

The present invention provides an accurate, fast response detecting device which combines low cost with effectiveness, which is inherently self-balancing and employs the same circuit and principle to detect all phenomena.

OBJECTS

It is a principal object of the present invention to provide an electronic on - off detecting device which is simple in construction, is very effective in use, and wherein, regardless of the phenomenon to be detected, the same knowledge of the user is applicable.

It is another object of the present invention to provide such a detecting device which is reliable, and which eliminate special biasing and balancing components normally used in electronic systems, such device being relatively inexpensive to manufacture and simple for the user to understand.

It is a further object of the present invention to provide such a detecting device which is extremely flexible and readily adaptable for use in sensing various phenomena.

An important feature of this invention is its stability and wide application of basic principle. Some applications will be described.

Changes in the phenomenon to be detected are represented by circuit oscillation or quiescence. This eliminates any need to monitor D. C. voltage levels in the various parts of the circuit. Any D. C. operating level drifts due to temperature, aging of components, etc. do not affect circuit reliability. Only the balance condition of the input bridge governs the oscillation point, and the ability of four arm bridges (Wheatstone) to self compensate for aging, temperature changes, etc. are well known. Wheatstone Bridges are also well known for the accuracy of their resolution of a balance point, a feature which makes the present invention's overall accuracy outstanding.

Since the oscillation point is governed mostly by the balance point of the bridge, a change in amplifier gain of 2 to 1 will not noticeably affect the accuracy of detection thereby making the reliability of the circuit practically independent of the semiconductors or tubes in the amplifier.

Typically high gain (sensitive) circuits are troublesome in the field since they pick up all sorts of extraneous electrical noise. The circuit of this invention employs a tuned circuit of high Q in its feedback loop producing a very high gain over only a small selected frequency. Thus the amplifier detects only signals that are in this very narrow spectrum.

Typical transmitters and other devices employing very narrow frequency bands are plagued by frequency drift of sender or receiver causing the sender to be producing signals at a frequency different than the receiver resulting in defective operation.

The system of this invention employs a very, very narrow frequency band of operation to get very high noise rejection. Yet, since the sender is a bridge driven from the amplifier output via a tuned circuit, the same tuned circuit determines the frequency selectivity of the amplifier and the frequency to the bridge (sender) for driving the amplifier. Obviously only one tuned frequency can exist in such a system since only one circuit determines the frequency of operation.

DRAWINGS

FIG. 1 is a circuit diagram disclosing the basic circuit used in the present invention.

FIG. 2 depicts additional circuitry attached to the circuit of FIG. 1 at point A to provide a D. C. output which can be fed to a load.

FIG. 3 shows circuitry added to the circuit of FIG. 1 at point B and utilizing a light source and a photosensitive resistor.

FIG. 4 discloses circuitry of FIG. 1 wherein R3 is a magnetic sensitive resistor.

FIG. 5 shows circuitry added to the circuit of FIG. 1 at point B wherein R3 is replaced by a coil and capacitor wherein the Q of the coil-capacitor circuit provides an effective resistance.

FIG. 6 discloses circuitry of FIG. 1 wherein R3 is a speaker utilized to sense movement.

FIG. 7 discloses circuitry of FIG. 1 wherein a diode arrangement is used.

FIG. 1 discloses a Wheatstone Bridge 10 including a first leg embodying resistor R1, a second leg including resistor R2, a third leg including resistor R3 and a fourth leg including resistor R4. The bridge is balanced in this instance with $(R3)/(R3 + R4)$ equal to $(R2)/(R1 + R2)$. The bottom of the bridge is connected to ground. A conductor 12 is connected at one end between R1 and R2 and at the other end to the negative input of a differential input, high gain (million to one, for example) common mode rejection amplifier 19. The amplifier is connected through conductor 14 to ground. The amplifier output is connected to the input D of the bridge circuit through feedback conductor 16. A conductor 18 is connected at one end between R3 and R4 and at the other end to the positive input of amplifier 13. A frequency selecting element is represented by a tuned circuit 20 comprising coil 22 and capacitor 24. A crystal or other frequency sensitive circuit could be used in place of the tank circuit.

Resistive element R3 is used herein as the detection element. In the specification and claims of this application, R3 will be described as a "resistance effect element". This term is intended to include any element which will provide a resistance effect at this point in the bridge. It includes such items as heat sensitive resistors, magnetic sensitive resistors, light sensitive resistors, elements with a variable Q factor, devices sensing pressure, viscosity, sound absorption, movement, and any other phenomenon which can be translated into a change in resistive effect at R3.

The invention is very versatile. The resistance effect element can be positioned at any location R1 through R4 depending upon whether or not resistance increases or decreases with the phenomenon which is being sensed. For example, when R3 is used, an increase in resistance will provide more positive voltage to the amplifier. A decrease in resistance of R4 will provide an increase in positive voltage to the amplifier. A decrease in resistance of R2 will provide an increase in positive voltage to the amplifier. An increase in resistance in R1 will provide an increase in positive voltage to the amplifier.

It is obvious that although oscillation may be described to represent a condition, the opposite stage (quiescent) may be used instead to represent a condition or vice versa. Any resistor in the bridge may be selected as the resistance effect element, depending on whether oscillation is desired on increase in resistance or whether quiescence is desired on increase in resistance.

The circuit of FIG. 1 is normally in a quiescent state. Assume that R3 is a heat sensitive resistor wherein increase in heat causes increase in resistance, and heat has been applied to it. Increase in heat will increase the resistance of R3 and the bridge will become unbalanced. More positive voltage is applied through conductor 18 to the positive side of the amplifier. Once this happens to the slightest degree, the amplifier breaks into oscillation and the circuit has very rapidly turned from "off" to "on". An A. C. output signal, at the frequency selected by the tuned circuit 20, is passed to a load. The signal can be first scaled up or down through a transformer if desired. When the heat is removed from R3 the voltage again rapidly decreases between R3 and R4. As soon as it decreases to the point where amplification through positive feedback is eliminated, oscillation is very rapidly stopped.

It will be seen that this provides a basic circuit which is simple, effective and very rapid in response. Although it is electronic in nature, it does not require special biasing or compensating components, etc.

In FIG. 2 a D. C. output circuit is shown attached at point A to the circuit of FIG. 1. This portion of the circuit provides means for applying a D. C. output voltage to the input of a load L. A capacitor 26 is positioned in conductor 28 to pass the A. C. output at point A, which is passed at the frequency of the tuned circuit 20. Diode 30 is positioned in conductor 32 which leads to ground. This converts the output from point A to a D. C. voltage. Capacitor 34 is placed in conductor 36 which leads to ground. This capacitor provides a filter which will further filter A. C. to ground. Thus, a D. C. voltage appears across load L. This can be the input to a computer for example. Also, if desired, the pick off at point A can first pass the A. C. signal through the primary coil in a step-up transformer (now shown).

FIG. 3 discloses added circuitry connected at point B in the circuit of FIG. 1. In this modification, R3 is a light sensitive resistor. Its resistance decreases with application of light.

When light is not present, it is in the oscillating state because R3 high positive feedback occurs through conductor 18 to amplifier 13.

A light source is indicated at 38 and a focusing lens is shown at 40. The light source can be connected to any desired power supply or the light supply can be from natural light (sun). When light strikes R3 the resistance of R3 is decreased, and this decreases positive feedback through conductor 18 to the positive input of amplifier 13, squelching oscillation of the amplifier.

When the light source 38 is turned off, positive feedback occurs through conductor 18 to the positive input of amplifier 13, and triggers the amplifier into oscillation. It is obvious that if R4 should be the light sensitive resistance, the reverse conditions would be true.

The hookup can be such that the light source 38 is connected to the output of amplifier 13 at point B as shown by dotted line 39, thereby creating an electric eye system responsive only to light from a specific source. The light source is a lamp focused on R3. When the oscillator is quiet, the lamp is out and the resistance of R3 is high. This causes positive feedback and oscillation begins. Oscillation causes the lamp to light, lowering the resistance of R3 and stopping the oscillations. Thus, the system blinks about its natural frequency (the time constant being essentially established by the lamp and the photo sensitive resistor).

When a self powered blinking light source is set up as an electric eye system, the blinking can only occur when a clear path is provided between amplifier powered lamp and the light sensitive resistor. Extraneous light, even though it reaches the photo cell and changes the resistance thereof, cannot cause blinking. This system is very reliable as a safety system since only a specific light source is detected and the system cannot be fooled by stray light or reflections from other sources.

FIG. 4 shows R3 as a magnetic sensitive resistance. Bringing magnet 41 within a specified distance from R3 will increase the resistance of R3. This drives amplifier 13 into oscillation through positive feedback. When the magnet is removed a certain distance away, the amplifier oscillation is squelched through negative feedback.

If the magnet 41 is attached to a machine slide and R3 is placed on some machine member, this circuit would perform as a limit switch. When the slide mounted magnet moves near the machine mounted resistance effect element R3, its position is detected through change in resistance of R3.

FIG. 5 shows circuitry added at point B in FIG. 1. This is a tuned circuit employing a coil 43 in parallel with a capacitor 42. It has an effective circuit resistance which is dependent upon the proximity of a conductor element or media 44 to the field generated by coil 43. When all conducting media are outside the field of coil 43, the effective circuit resistance is high, dependent only on the quality of the coil and capacitor themselves.

However, when a conductor 44 is brought into this field, the effective circuit resistance is lowered by the loading of the coil's magnetic field by the intruding conductive element. This principle is used in proximity switches and mine detectors. Note that when the tuned circuit of FIG. 5 is used as part of the bridge circuit, it serves as the frequency selective element of the total circuit, and the frequency selective circuit 20 of FIG. 1 is not used on the amplifier output.

FIG. 6 shows a speaker type device forming the resistive effect element at R3. It includes a speaker cone 46 with a coil 48 wound on the speaker core and a capacitor 49 in parallel with the coil 48. When the speaker cone 46 is in air, it will exhibit a certain resistance effect at the terminals of coil 48. When the cone is contacted by another medium, such as sand for example, its effective resistance at the coil terminals will be lowered due to change of viscosity at the speaker cone. Again, where the tuned circuit of this circuit is used, the tuned circuit 20 of FIG. 1 is unnecessary.

A piezoelectric crystal (not shown) can be used to detect a change in viscosity in the same manner as described above with respect to the speaker because the effective resistance across a piezoelectric crystal is a function of the crystal's freedom to move physically.

A strain gage (not shown) can be used to vary the resistance effect at R3 since any strain on the gage results in an inherent change in its resistance. If a strain gage is bonded to a beam of linear cross section, then a certain weight would cause a known strain and likewise cause a known change in the resistance of the strain gage. In this way, the present invention can be used as a scale or other weight detection device.

Likewise, a strain gage bonded to a pressure vessel (not shown) can produce resistance change with a pressure change to actuate the circuit. Since single element strain gages are plagued with temperature drift, the four arm bridge circuit can be used as a four arm strain gage bridge with the also well-known self compensating feature. The circuit configuration of FIG. 7 includes diodes 50 and 52 in back-to-back parallel with the combination in series with resistor R5 and the resistor-diode circuit in parallel with R2. This creates a very sharp transition from oscillating to quiescence and vice versa. With the overall circuit at quiescence or very low amplitude oscillation, the voltage across R2 is too low to cause the diodes to conduct. Therefore, resistor R5 is not effective in the circuit. As the amplifier output rises, the voltage across R2 rises and the diodes 50 and 52 begin to conduct, placing resistor R5 effectively in parallel with R2, thus lowering the effective resistance of the leg including R2 in the bridge. Lowering the effective value of R2 increases the positive feedback to the amplifier thereby causing it to be forcibly driven into higher oscillation. This causes the amplifier to operate in one of two stable states, either oscillating at high amplitude with diodes 50 and 52 conducting, or operation at a very low (quiescent) level with the diodes not 20 of FIG. 1 is unnecessary.

Having thus described my invention, I claim:

1. A closed loop bi-stable oscillator system comprising:
   a Wheatstone Bridge with four resistance legs including means in one leg adapted to accommodate a resistance effect element;
   a first output means between two legs of said Wheatstone Bridge;
   a second output means between the other two legs of said Wheatstone Bridge;
   a differential input, high gain, common mode rejection amplifier having a feedback means non-inductively connected to the input of said Wheatstone Bridge, having its positive input connected to the first output means of said Wheatstone Bridge, and having its negative input connected to the second output means of said Wheatstone Bridge;
   a single frequency selective element disposed in the bridge-amplifier circuit;
   wherein a change in resistance value of said resistance effect element resulting from detection of a phenomenon, changes the state of balance of the Wheatstone Bridge, causing a voltage input into said amplifier from said bridge circuit to drive said amplifier; and
   wherein a voltage signal of one polarity causes the amplifier to break into oscillation to drive said bridge and a voltage signal of opposite polarity causes sharp cut off of said oscillation; and
   means to connect a load to the output of said amplifier.

2. A closed loop bi-stable oscillator system as claimed in claim 1 wherein the resistance effect element is light sensitive and said device additionally comprises a light source and a light directing means for directing said light onto said element; and
   wherein interruption of said light effects a change in the resistance of said element.

3. A closed loop bi-stable oscillator system as claimed in claim 2 wherein the light source is connected to the amplifier output so that said light source blinks in relation to the amplifier output signal.

4. A closed loop bi-stable oscillator system as claimed in claim 1 wherein the resistance effect element is sensitive to a magnetic field.

5. A closed loop bi-stable oscillator system as claimed in claim 1 wherein the resistance effect element is a tuned circuit including a capacitor and a coil sensitive to the presence of an electrical conductor in its proximity to change the Q of the coil and the effective resistance of the tuned circuit in the bridge; and
   the resistance effect element is also the frequency selective element.

6. A closed loop bi-stable oscillator system as claimed in claim 1 wherein the resistance effect element is a heat sensitive element which changes resistance with a change in heat and which senses a change of temperature occurring in the proximity of said element.

7. A closed loop bi-stable oscillator system as claimed in claim 1 wherein the resistance effect element is an element which changes resistance with a change in motion.

8. A closed loop bi-stable oscillator system as claimed in claim 7 wherein the resistance effect element comprises a speaker device including a cone, a core, a coil wound on said core and a capacitor in parallel with said coil;
   said speaker cone sensing a change in surroundings and responding through a change in motion to alter the effective resistance of said resistance effect element; and
   the resistance effect element is the frequency selective element.

9. A closed loop bi-stable oscillator system as claimed in claim 1 wherein a pair of back-to-back diodes are disposed between one bridge output and one amplifier input.

10. A closed loop bi-stable oscillator system as claimed in claim 1 which is constructed and arranged so that the resistance effect element can also be the frequency selective element.

* * * * *